Aug. 12, 1952
C. S. BROWN ET AL
2,606,444
AIRSPEED INDICATOR WITH ALTITUDE CORRECTION
Filed Sept. 16, 1949
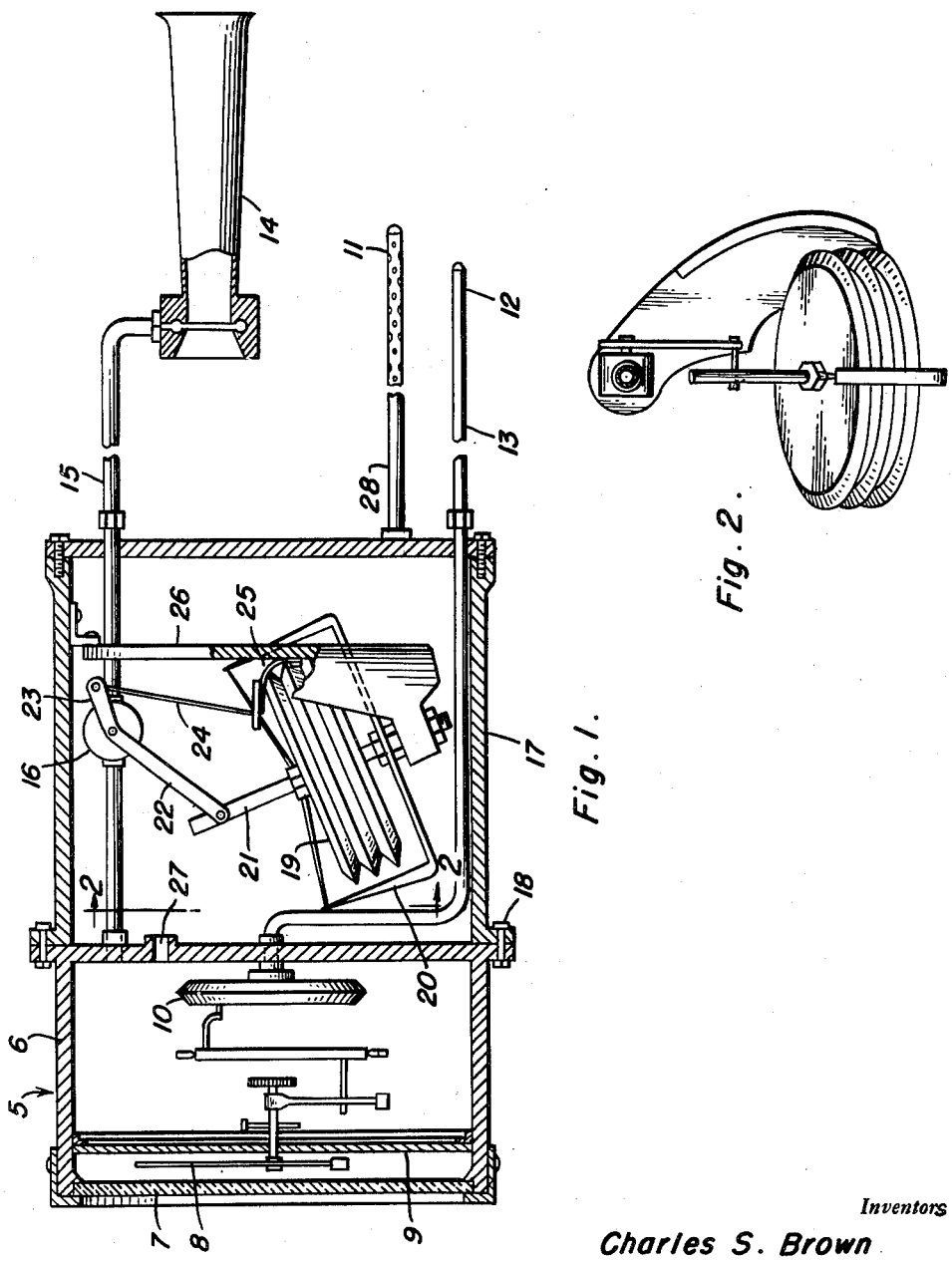
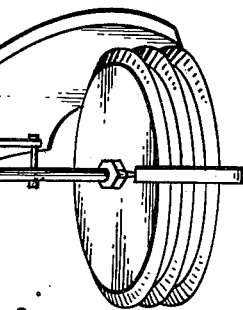
Fig. 2.
Fig. 1.
Inventors
Charles S. Brown
Cecil M. Hunter
By Clarence A. O'Brien
and Harvey B. Jacobson
Attorneys Patented Aug. 12, 1952

2,606,444

UNITED STATES PATENT OFFICE 2,606,444

AIR-SPEED INDICATOR WITH ALTITUDE CORRECTION

Charles S. Brown and Cecil M. Hunter, Amarillo, Tex.; said Brown assignor to said Hunter Application September 16, 1949, Serial No. 116,198

3 Claims. (Cl. 73—182)

This invention relates to airspeed indicators adapted for use on aircraft, and has more particular reference to a novel compensating device or means associated with the static pressure side of an airspeed indicator whereby automatic error correction is obtained.

Known types of airspeed indicators are designed to measure the dynamic pressure and, since air density is not constant at all altitudes, the calibration of a standard airspeed indicator cannot be made true for all altitudes. Therefore, in flight, the pilot must correct the indicated airspeed reading in accordance with the flight altitude.

An object of the present invention, therefore, is to provide an airspeed indicator with a novel automatic altitude correction means.

A further object is to provide a novel altitude correcting means, for airspeed indicators, which operates to compensate for the pressure drop due to decreased air density encountered at increased flight altitude.

Another object of the present invention is to provide novel compensating means between the dynamic and static pressure sides of an airspeed indicator whereby automatic error correction is obtained.

The nature of the present invention will become apparent from the following description when considered with the accompanying drawing, in which:

Figure 1 is a somewhat diagrammatic view, partly in section and partly in elevation, showing an airspeed indicator associated with an altitude error compensator embodying the present invention.

Figure 2 is a sectional view taken on the line 2—2 of Figure 1, with parts omitted.

The differential pressure responsive element of known airspeed indicators is exposed at one side to the static pressure and at its other side to the dynamic pressure. For a given craft velocity at a given altitude the differential pressure actuating the pressure responsive element will remain constant. However, this relationship cannot exist at all altitudes for the same craft velocity because the air density decreases with increased altitude. With an increasing flight altitude, therefore, the air density decreases, as does the pressure differential across the pressure responsive element, and gradually the underreading error of the indicator is increased.

To overcome the increased reading error and the necessity of the pilot to continuously apply a correction to the readings, a novel altitude correction is provided by the present invention, whereby an increasing suction and decreasing pressure is produced at the static pressure side of the pressure responsive element as the flight altitude increases, and vice versa. In this manner, notwithstanding the flight altitude, the proper relationship in differential pressure across the pressure responsive element is maintained for the same craft velocity.

The altitude correction consists in the provision of a suction producing device having a suction line in communication with the interior of the casing of the airspeed indicator so as to permit exposure of the outside of the pressure responsive element of said indicator to suction, a valve for controlling flow of air through said suction line, and a pressure responsive element exposed externally to the static pressure and operatively connected to said valve, whereby the valve is gradually opened to increase the suction and reduce the static pressure in the casing of the airspeed indicator at a given rate as the flight altitude increases, and vice versa. The rate of increased or decreased suction or reduction or increase of static pressure is about 2% per thousand feet of altitude to correct the error in a standard airspeed indicator. Obviously, the reduction or increase of static pressure in the casing of the airspeed indicator keeps the pressure differential across the pressure responsive element of said indicator constant so that a correct reading is had at all times.

Referring in detail to the drawing, 5 indicates a conventional airspeed indicator comprising a casing 6 having one end provided with a cover glass 7, a pointer 8 mounted for rotation over a dial 9, and a pressure responsive element or expansible and contractible diaphragm 10 operatively connected to said pointer. The interior of casing 6, and therefore the outside of element 10, is exposed to static pressure from a static pressure source 11 corresponding to the static side of a conventional Pitot tube. Dynamic pressure is communicated to the interior of element 10 from a dynamic or impact pressure source 12 by way of a conduit 13, the source 12 corresponding to the dynamic or impact side of a Pitot tube.

According to the present invention, a suction producing means, such as the Venturi tube 14 is connected by a suction line 15 to and in communication with the interior of casing 6, and the flow of air through the line 15 is controlled by a suitable valve 16 at a point within a sealed housing 17 which may be attached, as at 18, to the back of the casing 6 of the airspeed indicator whose reading is to be corrected. Mounted in housing 17 is a pressure responsive element or bellows 19 whose free end is guided by a guide device 20 and carries a stem 21 connected to the operating lever 22 of valve 16. The lever 22 has an arm 23 connected by a link 24 to a spring 25 attached to the mount 26 of element 19, whereby said spring imposes a slight tension on said element 19 and avoids any lost motion. The casing 6 has a static pressure opening 27 which communicates with the interior of housing 17, and a conduit 28 from the static pressure source 11 communicates with the interior of housing 17 to expose the exterior of the element 19 to the static pressure, as well as to similarly expose element 10 thereto by way of opening 27.

In operation, as craft altitude is increased the pressure acting within element 10 decreases due to drop in air density. However, element 19 expands to open valve 16 so that suction produced in casing 6 through line 15 correspondingly reduces the pressure in said casing and about element 10 so as to keep the pressure differential across the latter constant. In other words, the same pressure drop is caused about element 10 as occurs within the same due to increased altitude and decreased air density, the valve 16 gradually opening further, as altitude increases, to cause a pressure drop outside element 10 and within casing 6 of about 2% per thousand feet. The reverse operation takes place during craft descent. Under this condition, suction in casing 6 is decreased as element 19 contracts and gradually closes valve 16, in accordance with decrease in altitude and increase in air density. Valve 16 is so calibrated as to compensate for variations in altitudes, pressures and/or these effects on the venturi unless such effects on the venturi are negligible.

In the foregoing manner, the effect of a decrease in dynamic pressure with an increase of altitude is offset, and the indicator is automatically corrected for errors otherwise arising during varying altitude flight.

Modifications and changes in structural details are contemplated within the spirit of the invention as claimed.

Having described the invention, what is claimed as new is:

1. An airspeed indicator comprising a hermetic casing provided with a window, an indicator mechanism within the casing and viewable through said window, a differential pressure responsive element also arranged within said casing and connected to said indicator mechanism to drive the latter, a static pressure and a dynamic pressure conduit communicating with opposite sides of said differential pressure element, the dynamic pressure conduit extending into the air stream, means for compensating the pressure responsive element for change in altitude comprising a conduit communicating with the interior of said casing, a valve for controlling flow through said conduit, a Venturi tube disposable in the air stream, the air controlled conduit being in communication with the throat of said Venturi tube, and pressure responsive means also within said casing and connected to said valve.

2. The combination of claim 1 wherein said valve includes an operating lever, said pressure responsive means comprising a bellows member and a stem carried by said bellows member connected to said valve operating lever.

3. The combination of claim 2 and resilient means attached to said valve lever and engaging said pressure responsive means for imparting a tension to the latter for substantially eliminating the lost motion.

CHARLES S. BROWN.
CECIL M. HUNTER.

REFERENCES CITED

The following references are of record in the file of this patent:

UNITED STATES PATENTS

| Number | Name | Date |
|---|---|---|
| 1,426,698 | Zahm | Aug. 22, 1922 |
| 2,177,244 | Ciamberlini | Oct. 24, 1939 |
| 2,295,728 | Gess | Sept. 15, 1942 |
| 2,391,060 | MacKay | Dec. 18, 1945 |
| 2,458,331 | Borell | Jan. 4, 1949 |